(12) United States Patent
Bull et al.

(10) Patent No.: US 6,612,750 B1
(45) Date of Patent: Sep. 2, 2003

(54) ADAPTER FOR INTERCONNECTING OPTICAL FIBER CONNECTORS

(75) Inventors: Stephen Vincent Bull, Lac Beauport (CA); Steeve Potvin, Duberger (CA)

(73) Assignee: EXFO Electro-Optical Engineering Inc., Vanier (CA)

( * ) Notice: Subject to any disclaimer, the term of this patent is extended or adjusted under 35 U.S.C. 154(b) by 0 days.

(21) Appl. No.: 09/138,393

(22) Filed: Aug. 24, 1998

(30) Foreign Application Priority Data

Sep. 2, 1997 (CA) .............................................. 2214554

(51) Int. Cl.[7] ................................................ G02B 6/38
(52) U.S. Cl. .............................. 385/65; 385/72; 385/75; 385/77; 385/83; 385/55
(58) Field of Search ............................. 385/53, 65, 72, 385/83, 75, 138, 56, 60, 66, 68

(56) References Cited

U.S. PATENT DOCUMENTS

| | | | |
|---|---|---|---|
| 4,279,469 A | * | 7/1981 | Forman |
| 4,787,701 A | * | 11/1988 | Stenger et al. |
| 5,073,042 A | | 12/1991 | Mulholland et al. |
| 5,074,637 A | * | 12/1991 | Rink ............................ 385/56 |
| 5,233,675 A | * | 8/1993 | Cannetti ...................... 385/75 |
| 5,297,227 A | | 3/1994 | Brown et al. |
| 5,333,222 A | | 7/1994 | Belenkiy et al. .............. 385/70 |
| 5,408,557 A | * | 4/1995 | Hsu ............................. 385/72 |
| 5,444,806 A | | 8/1995 | de Marchi et al. ............ 385/75 |
| 5,506,922 A | * | 4/1996 | Grois et al. ................... 385/75 |
| 5,563,971 A | | 10/1996 | Abendschein ................ 385/55 |
| 5,717,801 A | * | 2/1998 | Smiley ......................... 385/60 |
| 5,774,612 A | * | 6/1998 | Belenkiy et al. .............. 385/72 |

* cited by examiner

Primary Examiner—Audrey Chang
(74) Attorney, Agent, or Firm—Thomas Adams (57) ABSTRACT

An adapter for receiving optical fiber connectors, of the type having an inner part suitable for receiving an internal connector carrying an internal optical fiber having an end ferrule, and having an outer part suitable for receiving an external connector having an external optical fiber with an end ferrule, is made suitable for use with different external connectors by having the outer part readily separable from the inner part. The parts have complementary engaging surfaces and cooperating engaging means which lock the two parts together upon relative rotation of one of the parts relative to the other through about a right angle. The usual alignment sleeve is carried by the outer part, and when this part has been separated from the inner part the internal fiber ferrule is accessible for cleaning. A further feature of the invention is a cap which automatically closes over the outer end of the adapter, upon removal of the outer connector, both to protect the interior fiber end ferrule from contamination, and to protect a user's eyes from laser light.

21 Claims, 5 Drawing Sheets

ADAPTER FOR INTERCONNECTING OPTICAL FIBER CONNECTORS

BACKGROUND OF THE INVENTION

1. Field of the Invention

The present invention relates to an adapter of the type used for interconnecting two optical fibers, for example in the situation where it is required to connect a testing device, having an internal fiber, to an external fiber, for testing the external fiber or an optical circuit to which it is connected.

2. Prior Art

There is a common need to provide temporary connections between an internal optical fiber or fibers, which are part of testing equipment, and external fibers which are to be themselves tested or which are parts of optical circuits to be tested. The testing equipment is usually contained in a case having a panel providing terminals or "adapters" which are connected internally to a testing device, usually incorporating a laser light source and/or a receiver, and which are capable of receiving connectors mounted on the ends of the external fibers. Sometimes the testing devices are permanently connected or "hard wired" to the internal portions of the terminals. More commonly however, the internal fibers have plug type connectors and the terminals are in the form of adapters which have a double ended receptacle with an inner part accessible from inside the panel for receiving the internal fiber connector, and an outer part on the outside of the panel for receiving a plug type connector at the end of an external fiber.

It is common for the adapters to have an alignment sleeve which is a close fit on ferrules fixed to the ends of each of the connected optical fibers. Apart from this, however, the connectors vary widely. Commonly used connectors are so-called FC connectors, having a nut which engages an externally screw threaded barrel portion of the adapter which surrounds the alignment sleeve, and ST connectors having a bayonet type connection to a similarly located barrel. Still others, known as SC connectors, have a rectangular plug which is a push fit into a rectangular socket and which is retained by latches. One known testing apparatus usually has internal fibers with FC type connectors. However, the apparatus may need to be used with external fibers having different types of connectors, and it would clearly be advantageous to have adapters capable of being changed to suit such different connectors.

Most adapters are designed to receive, in their opposite ends, two connectors of similar type, but some are known which can receive different types of connector. For example, U.S. Pat. No. 5,073,042, which issued Dec. 17, 1991 to Mulholland et al., shows a hybrid adapter comprising two parts, one designed to receive an FC connector, and the other to receive an SC connector, the two parts being joined by bolts. Clearly, different arrangements can be made by mixing and matching different end parts. However making such connections with bolts or the like is not practical for most users.

U.S. Pat. No. 5,297,227, which issued Mar. 22, 1994 to Brown et al., also shows an adapter formed in two parts, i.e. an inner part and an outer part, connected by the push fit of a cylindrical protrusion into a cylindrical housing. Each part can be one suited to any particular type of connector, so that different parts can be combined in different combinations depending on the types of connectors with which the optical fibers to be tested are equipped. A series of the internal parts is held by an instrument panel, and a series of the external parts is held by a mounting panel, the parts being held together by fixing the mounting panel to the instrument panel. Apart from this the adapters themselves do not have any means for holding the parts together.

U.S. Pat. No. 5,333,222, which issued Jul. 26, 1994 to Belenkiy et al., shows an adapter formed of two parts which are held together by latch arms, but it seems that this is a permanent connection and it is not intended that the parts be separated and used with different parts.

A different approach is used by Diamond S. A., for example as described in U.S. Pat. No. 5,444,806, which issued Aug. 22, 1995 to de Marchi et al. Here the panel carries a plug type connector with a protruding ferrule, which mates with a sleeve adapter which is movable and which has its outer end mated with another plug type connector. This has the drawback that the interior plug type connector is "hard-wired" to the device inside the testing instrument, rather than being connected by a removable connector as is usual, and when a device has to be added to the testing equipment, or changed, its end connector usually has to be removed and the end of its fiber spliced to a connector on the panel.

Another problem with the commonly used adapter arrangements, i.e. those in which the adapter is fixed to the panel, is the difficulty of cleaning the ferrule at the end of the internal fiber; dirty ferrules cause a large proportion of malfunctions in apparatus of this kind. While the external fiber ferrule projects from the end of the connector and is easily cleaned, the internal fiber ferrule can usually only be cleaned by opening the testing equipment case and removing the internal fiber connector from the adapter. Sometimes this is facilitated by making the panel removable, but this requires tools for removing the panel. In any event, there is a possibility of damaging the fiber by bending it too sharply, or harming other delicate devices in the case. It would be desirable to make the end of the internal fiber ferrule accessible from outside the case, for cleaning purposes.

It is one object of the invention to provide an adapter having two parts which are readily separable, i.e. do not require removal of screws or the like, so that the outer part can easily be adapted to the type of connector to be used. It is a secondary object to provide an arrangement in which removal of the outer part enables the internal fiber ferrule to be cleaned.

It is also desirable that the internal fiber ferrule be protected from contamination, and that users' eyes be protected from laser light emitted from the internal fiber, when there is no connector present. Some prior art designs deal with the contamination problem by providing protective caps or dust covers which are a push fit onto the end of the adapter; however such devices are easily lost, and are not effective in protecting a user's eyes. In other designs, a hinged shield has been used, which both prevents contamination, and also protects an operator's eyes. Such a shield is shown in U.S. Pat. No. 5,506,922, which issued Apr. 9, 1996 to Grois et al., in the form of a flap mounted on the flat side of a rectangular SC type receptacle. This design would not be suitable for use with other types of adapter receptacle, most of which have a protruding barrel portion which receives an outer sleeve and so could not accommodate the kind of flap shown in Grois et al.

It is thus a further object of the invention to provide a shield or dust cover, both for limiting contamination, and for protecting a user's eyes, and which is suitable for adapters designed for use with any commonly used connector type.

SUMMARY OF THE INVENTION

In accordance with one aspect of the invention, there is provided an adapter for interconnecting optical fibers connectors, having a first part for connection to a first optical fiber having an end ferrule, and a second part suitable for receiving optical fiber connector having a second optical fiber with a second end ferrule, the end ferrules being received in an alignment sleeve held within the adapter when both connectors are in place in the adapter, wherein the second part is readily separable from the first part, the parts having complementary engaging surfaces, and having cooperating engaging means which allow the two parts to be brought together with relative axial movement in one rotational position of the parts, and which include camming and detent means which draw and lock the two parts together upon relative rotation of one of the parts to a second rotational position relative to the other.

Preferably, the camming and detent means include part-circular grooves in the first part, having undercut camming surfaces terminating in recesses, and retaining elements projecting from the second part, the retaining elements being movable through entranceways into the grooves with relative axial movement of the parts in one relative rotational position, and being capable of movement along said grooves upon relative rotation of the parts, preferably through about 90° and, in any event, less than 180°, to the second rotational position at which the elements are retained in the recesses, these recesses providing detent means. A resilient element may be provided between the two parts, with the detent means tending to prevent movement of the retaining elements until the resilient element is compressed. The groove and retaining element arrangement is contained within the same "footprint" area normally required of an adapter of this general type, so does not require additional space.

The provision of detent means as described means that the parts are positively locked together and the second part does not move when connectors are screwed onto or unscrewed from this part, as might happen if the parts were connected by a simple screw.

Preferably, the alignment sleeve is retained the second part, and when this part is separated from the first part the internal ferrule is accessible for cleaning.

It is common for the ends of ferrules to be slanted, so that two mating ferrules must be rotationally aligned. In order to meet the alignment requirements, the retaining elements and entranceways are differentiated so that the two parts can be connected together only in one particular rotational position. The parts have conventional means to ensure that the ferrules of mating connectors are properly rotationally aligned relative to the inner and outer parts.

In order to protect the ferrule of the first fiber against contamination, and also to protect a user's eyes, the second part preferably has a cap connected thereto by hinge means which is biassed to close the cap over the ferrule of the internal fiber when no external connector is present. For this purpose, the second part has a partially flat side surface, and the cap is connected to the second part by a living hinge mounted on the flat side surface. The cap is recessed to fit over standard adapter receptacles capable of receiving FC, ST, SC, and preferably other types of connectors. The cap may be used on adapters which do not have the cooperating engaging means described above.

According to another aspect of the invention, there is provided an adapter for interconnecting optical fiber connectors, having a first part suitable for connection to a first optical fiber having an end ferrule, and having a second part suitable for receiving an optical fiber connector having a second optical fiber with an end ferrule, wherein said second part has a substantially flat side surface, and wherein a cap is connected to the second part by a living hinge having a flange mounted on said flat side surface, said cap having a hollow interior so as to be capable of closing over a projecting portion of the second part to prevent contamination of the internal optical fiber end ferrule.

When the adapter is mounted upon a panel, both of the first and second parts will normally be mounted on the same side of the panel. In the following specific description, the part that is closer to the panel will be termed the "inner" part and the part further from the panel termed the "outer" part. However, the invention is not restricted to adapters which are mounted on a panel or any other piece of equipment.

BRIEF DESCRIPTION OF THE DRAWINGS

A preferred embodiment of the invention will now be described by way of example with reference to the accompanying drawings, in which.

DETAILED DESCRIPTION

Figure 1:
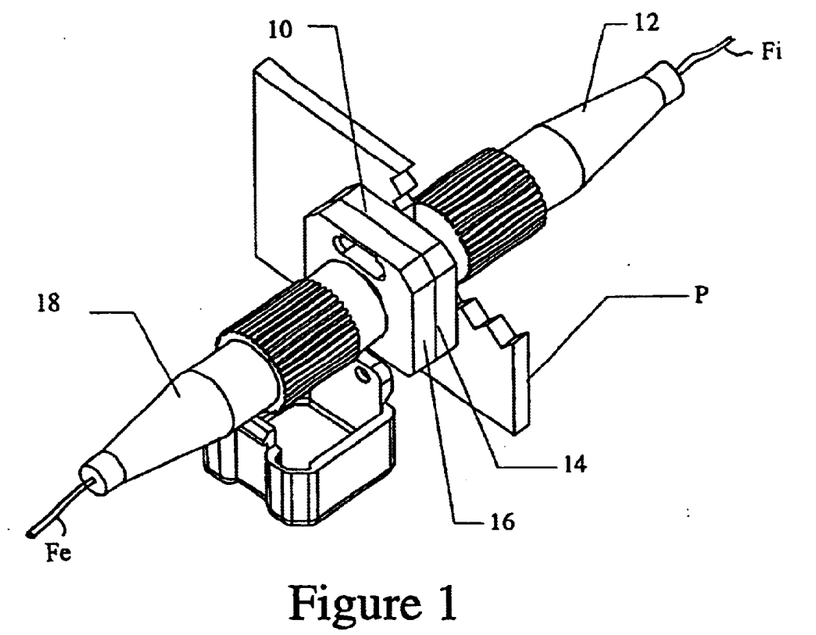
FIG. 1 is a perspective view of an adapter of this invention, as mounted on the panel of an instrument case, with both internal and external connectors in place, and with the panel cut away to show the internal connector.
Figure 2:
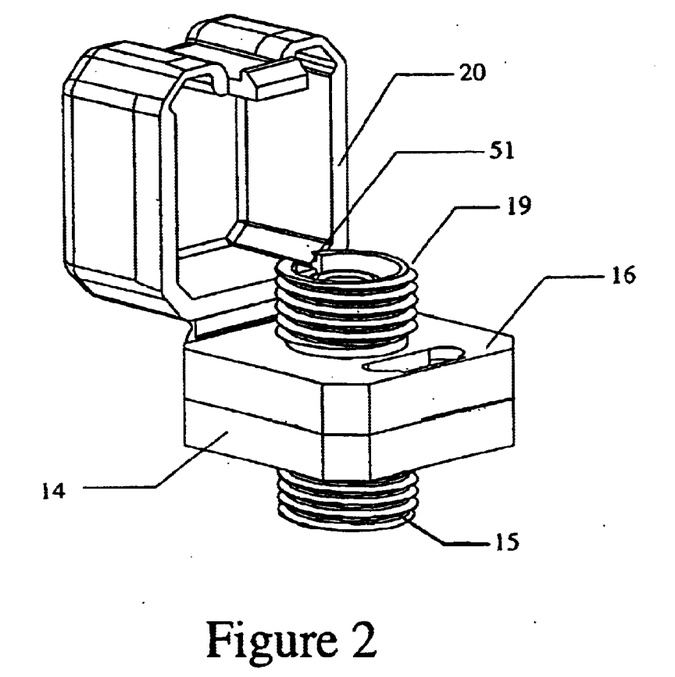
FIG. 2 is a similar but enlarged view of the whole adapter, removed from the panel and from the connectors.

Referring to the drawings, FIGS. 1 and 2 show the adapter 10 of this invention mounted on the panel P of the case of a testing instrument such as an ODTR (optical time domain reflectometer). Within the testing instrument, a laser or other source is connected to an internal fiber Fi, which terminates in an internal plug type connector 12 of well known form, usually an FC connector. As shown in FIG. 1, connector 12 is attached to the inner part 14 of the adapter 10, which is secured to the exterior of the panel P by screws or the like, described below, while being internally accessible when the case is opened. Removably secured to the part 14 is an outer (or upper) part 16, suitable for receiving an external connector 18 also of the FC type attached to the end of an external fiber Fe. The connectors 12 and 18 are attached by being screwed onto screwthreaded barrel portions 15 and 19 of the respective inner and outer parts. When the external connector 18 is removed from the adapter, a cap 20 automatically closes, at least partially, over the outer end of the part 16, to protect the interior parts from contamination, and also to protect a user's eyes from laser light; this is further described below.

Figure 3:
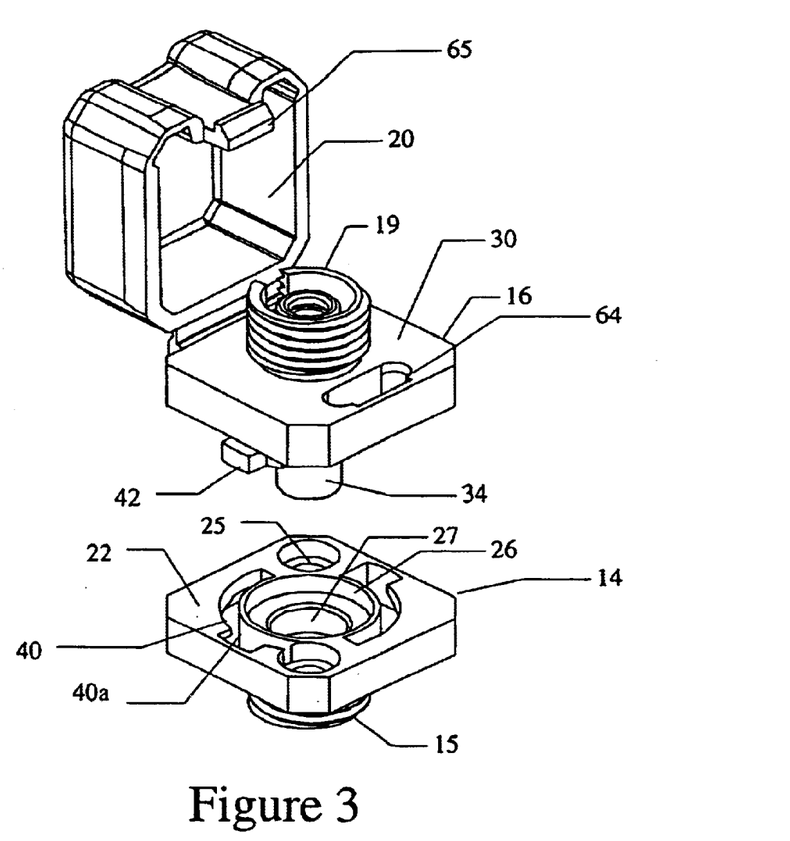
FIG. 3 is a similar view similar to FIG. 2, but with the two parts of the adapter separated.
Figure 4:
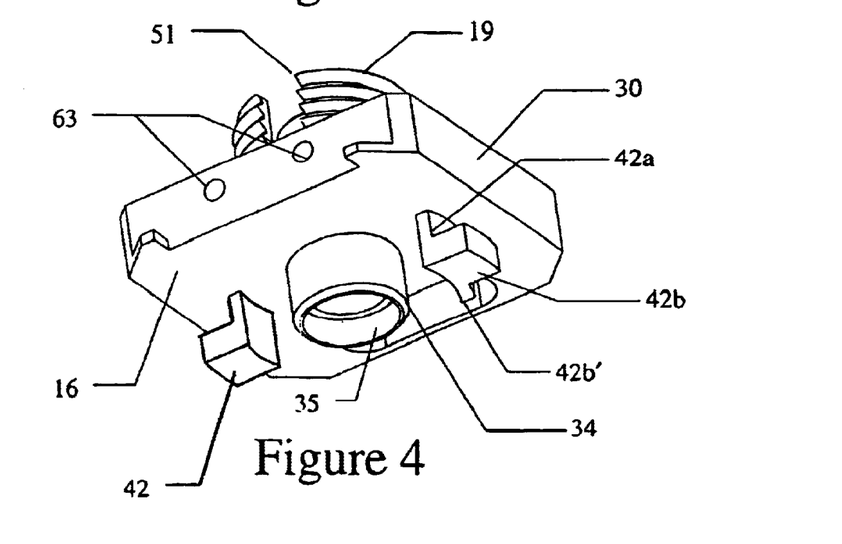
FIG. 4 is a view of the main component of the outer part of the adapter.
Figure 5:
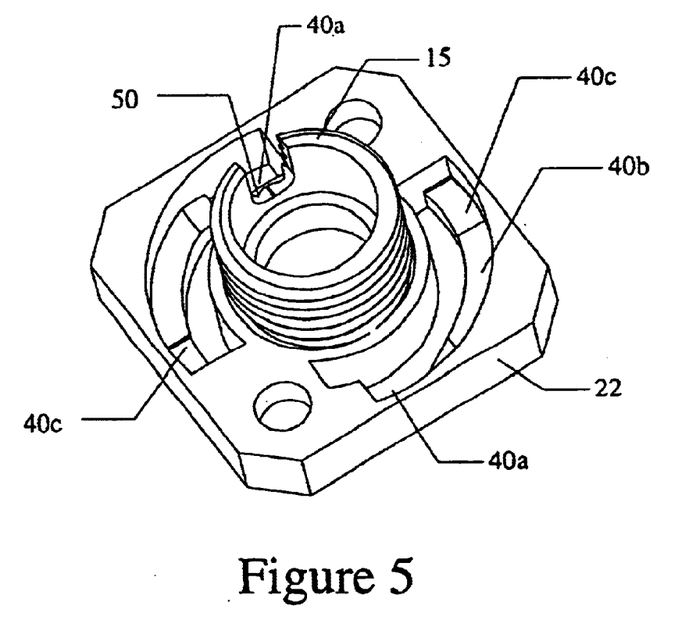
FIG. 5 is an underside view of the inner part of the adapter.
Figure 6:
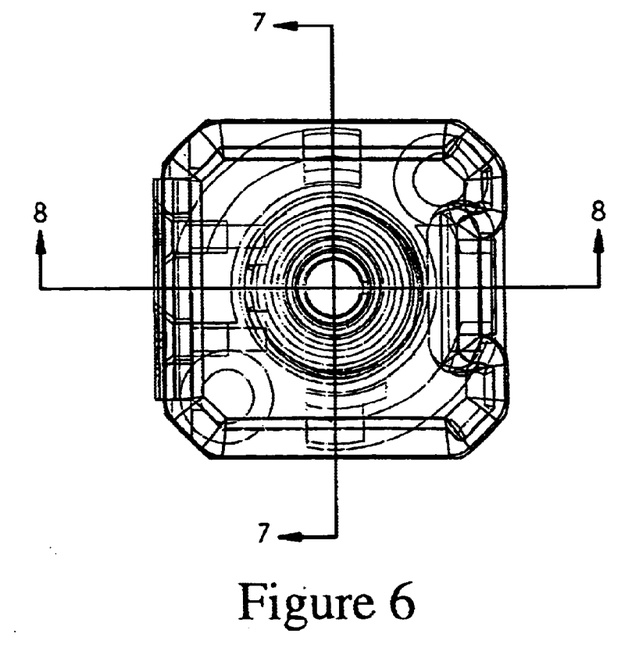
FIG. 6 is a plan view of the adapter, with the cap closed.
Figure 7:
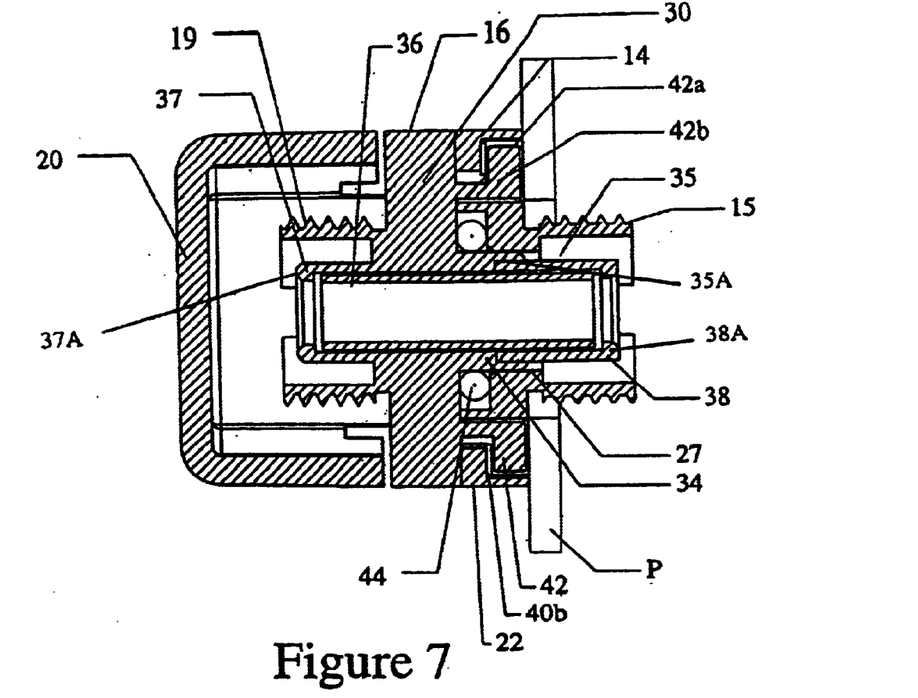
FIG. 7 is a sectional elevation on lines 7—7 of FIG. 6.

In FIG. 3, the parts 14 and 16 are shown separated, while FIG. 4 shows the outer part disassembled. Further details of the parts are shown in FIGS. 5–8.

As seen in FIGS. 3, 5, 7 and 8, the inner part 14 has a square flange 22 with the same dimensions as a regular flange type FC connector, from the lower side of which extends the barrel 15. Opposite corners of the flange 22 have screw holes 25 for mounting the flange to the exterior of the panel P, shown in FIGS. 1 and 7, at the sides of an aperture in the panel through which the barrel 15 projects. The main upper face of the flange 22 is flat, but its center has a circular well 26, surrounding a central socket 27.

The outer part 16 shown in FIGS. 3, 4, 7 and 8 has a flange 30 with a periphery which is the same shape and size as the flange 22, and from the upper face of which projects the threaded barrel portion 19. Part of its lower face is flat, and this, and the upper face of the lower part flange 22, provide complementary engaging surfaces for the parts 14 and 16. From the bottom of the flange 30 there projects a cylinder 34 which surrounds a socket 35 leading to an axial bore of smaller diameter than the socket. This axial bore receives a split alignment sleeve 36 of standard design and which is suitable for receiving and aligning two opposed 2.5 mm. ferrules. The sleeve 36 is received at its upper end within a recess in a bushing 37 projecting axially within the barrel 19, and is held in place by a retaining collar 38 which is a push fit into the socket 35. When the part 16 is fitted to part 14 the exterior surface of the cylinder 34 is located by being a close fit into the socket 27 in the center of the inner part 14, these parts providing an accurate centering system. As is conventional, when connectors are in place the end ferrules of their fibers meet at about the center of the alignment sleeve 36.

The outer part 16 is connected to the inner part 14 by a quick release mechanism constituted by undercut, part circular grooves 40 formed in the flange 22 of the inner part 14, and cooperating retaining elements 42 projecting down from the outer part 16. Each of the grooves 40 subtends about 90° at the center of the adapter part. Each groove has a wide entranceway 40a at a first end, the remainder of the groove being undercut on its outer side to the same width as the entranceway so as to have an overhanging outer wall 40b. This outer wall 40b provides a camming surface which slopes inwardly, i.e. towards the face of the flange 22, and terminates in end recesses each separated from the main part of the outer wall by a detent surface 40c, seen in FIG. 5.

The grooves 40 are each designed to receive one of two retaining elements 42, each of which has a relatively thin, depending leg portion 42a terminating in an outwardly projecting foot portion 42b. The foot portions 42b are sized so that when the inner and outer parts are united the foot portions can pass through the entranceways 40a, and as the outer part is rotated relative to the inner part through about a right angle, the foot portions pass along the camming surfaces 40b until they enter the recesses beyond the detents 40c. A resilient O-ring 44 fitted onto cylinder 34 prior to assembly is received within the well 26, and is compressed during engagement of the two parts. The detents 40c provide an anti-turn feature since the O-ring must be compressed before the foot portions can be moved out of these detents, so that the parts are not liable to be separated accidentally.

As shown in FIG. 4, one of the foot portions 42b has a lateral projection 42b', and this is sized to pass through one of the entranceways 40a which is larger than the other. This ensures that the inner and outer parts of the adapter are rotationally aligned in a unique manner, so that ferrules with angled ends will fit together correctly. Furthermore, the barrel portions 15 and 19 have notches 50 and 51 to receive the usual keys (not shown) of the connectors and rotationally align them so that the ferrules are properly aligned.

If the outer connector 18 is removed, and the outer adapter part 16 is then separated from the inner part 14, with the inner connector 12 still in place, the alignment sleeve 36 is retained in the outer part 16 by the retaining collar 38. This means that the inner fiber end ferrule is exposed within the well 26 of the inner part, and is accessible for cleaning.

Figure 8:
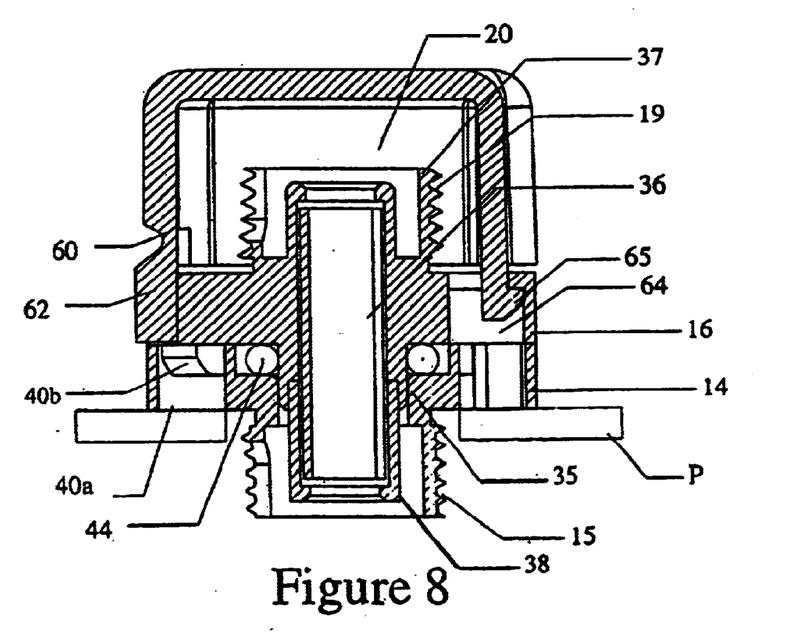
FIG. 8 is a further sectional elevation on lines 8—8 of FIG. 6.

As mentioned above, the outer connector part 16 carries cap 20 which automatically covers the outer end of this part when no connector is present. The cap is formed as a plastic molding, as best shown in FIGS. 4 and 8, and is integrally connected by a "life" or living hinge 60 to leaf or flange 62 having screw holes, by which the flange can be fixed to threaded holes 63 in a flat rear side surface of the outer part flange 30. The hinge 60 is such that it biasses the cap towards the closed position when no connector is present on the barrel 19, but does not close it completely since that would require a greater spring force. On the front side of the outer part the flange 30 has an elongated aperture 64 sized to receive a detent 65 projecting down from the front side of the cap. The flexibility of the cap allows the detent to bend inwards and to be retained by a catch type formation on the inner face of the aperture 64 when the cap is fully closed. It is released by pushing in the front of the cap.

Figure 9:
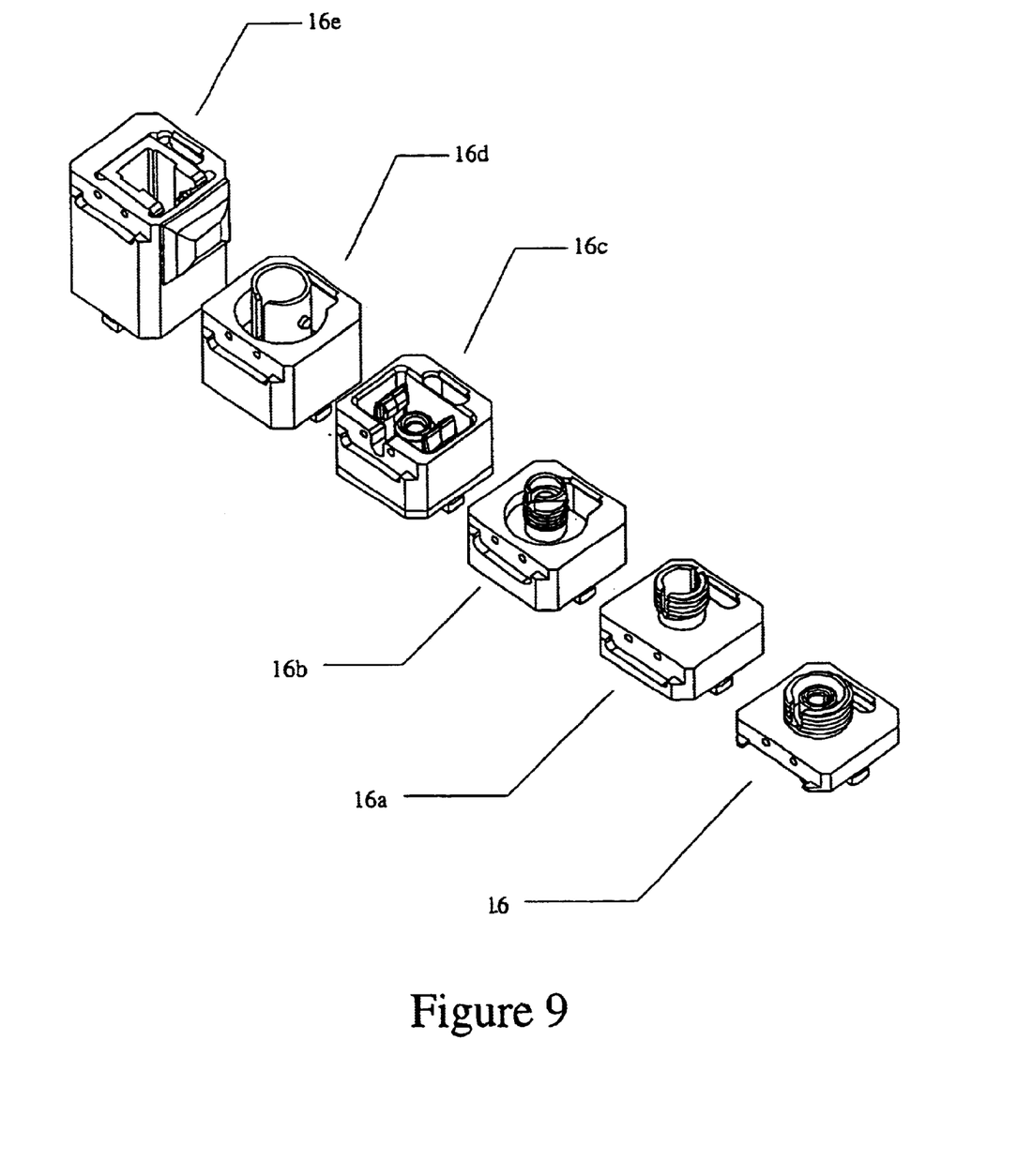
FIG. 9 is a perspective view of adapter parts of this invention suitable to different connector types.

As indicated above, a central feature of this invention is that it permits an adapter to be readily connected to different optical fiber circuits, merely by replacing the outer part 16 by one suited to a different connector. FIG. 9 shows, as examples, a range of different outer parts which can be used. In addition to the FC part 16, there is an adapter part 16a suited to an HMS connector, a part 16b suited to a Din 2.5 connector, a part 16c suited to an SC connector, a part 16d suited to an ST connector, and a part 16e suited to an E2000 connector. As shown, each of these parts has interengaging means corresponding to the retaining elements 42 described above. Also, each has screw holes suitable for receiving the flange part 62 of a cap, which can be the same cap 20 already described and which is suitable for all the types of the connector parts, since the interior of the cap can accommodate the projections of the parts such as part 16, 16a, 16b, and 16d.

Although the above-described embodiment is for a testing device, the invention embraces adapters for other purposes, such as patch panels of telecommunications central offices, or other situations where a fiber is to be connected through a panel to another fiber or a device.

Although the above-described embodiment uses ferrules of 2.5 mm. diameter, which are widely used, the invention is applicable to adapters for connectors having other sizes of ferrule.

We claim:

1. An adapter for interconnecting a first optical fiber and a second optical fiber having a first end ferrule and a second end ferrule, respectively, the adapter comprising:

a first part and a second part for receiving the first optical fiber and the second optical fiber, respectively;

a ferrule alignment sleeve having opposite ends for receiving the first end ferrule and the second end ferrule, respectively, when the first and second optical fibers are received in said first and second parts, respectively;

the ferrule alignment sleeve being held in the second part; and quick-release fastening means for connecting the second part to the first part so that the second part and ferrule alignment sleeve are readily separable from the first part, the quick-release fastening means comprising
cooperating engaging means provided on complementary surfaces of the first and second parts, respectively, the engaging means allowing the two parts to be brought together with relative axial movement in one rotational position of the two parts and including camming and detent means which, upon relative rotation of one of the parts relative to the other to a second rotational position, draw the two parts together and lock the two parts in said second rotational position;

the arrangement being such that, when the second part is separated from the first part and the first optical fiber is still received in the first part, the alignment sleeve is retained in the second part and an end surface of the first end ferrule is readily accessible for cleaning;

wherein said complementary surfaces comprise surfaces of flange portions of the first and second parts, respectively, each flange portion extending radially outwardly from the axis along which the two parts are drawn together, and said camming and detent means include, in said surface of the flange portion of one of said two parts, part-circular grooves having undercut camming surfaces, and retaining elements projecting axially from said surface of the flange portion of the other of said two parts, said retaining elements each having an axially extending leg and a foot portion projecting radially from a distal end of the leg, the foot portion being movable through entranceways into said grooves with relative axial movement of the parts in said one rotational position thereof and capable of movement along said grooves upon relative rotation of the parts to said second rotational position at which the elements are retained in the grooves.

2. An adapter according to claim 1, wherein said rotational positions are less than 180° apart.

3. An adapter according to claim 1, wherein said camming and detent means include part-circular grooves in one of said two parts having undercut camming surfaces terminating in recesses, and retaining elements projecting from the other of said two parts, said retaining elements being movable through entranceways into said grooves with relative axial movement of the parts in said one rotational position thereof and capable of movement along said grooves upon relative rotation of the parts to said second rotational position at which the elements are retained in the recesses, which recesses provide said detent means.

4. An adapter according to claim 3, wherein said part-circular grooves are in said first part.

5. An adapter according to claim 1, wherein a resilient element is provided between said first and second parts, and wherein said detent means tend to prevent relative rotation of said first and second parts away from said second rotational position until said resilient element is compressed.

6. An adapter according to claim 1, wherein said second part has a cap connected thereto by hinge means which tend to close the cap over the first optical fiber end ferrule when the two parts are engaged but no second optical fiber is received in the second part, and cause a peripheral edge of the cap to close against a juxtaposed surface of the second part and prevent ingress of contamination, thereby protecting the first optical fiber end ferrule from contamination.

7. An adapter according to claim 6, wherein said second part has a substantially flat side surface, and wherein the cap is connected to said second part by a flange of a living hinge mounted on said flat side surface.

8. An adapter according to claim 7, wherein the living hinge biases the cap to the closed position.

9. An adaptor according to claim 1, wherein the grooves terminate in recesses wherein the retaining elements are retained when in said second rotational position, the recesses providing said detent means.

10. An adapter according to claim 1, wherein said engaging means are so configured that there is only one said second rotational position, so as to allow insertion of first and second end ferrules having angled end surfaces in one orientation only, so as to ensure mating of the juxtaposed end surfaces within the ferrule alignment sleeve.

11. An adapter according to claim 1, wherein said grooves terminate in recesses, which recesses provide said detent means, said foot portions being engaged in said recesses in said second rotational position, and wherein a resilient element is provided between said first and second parts, and wherein said detent means prevent relative rotation of said first and second parts away from said second rotational position until said resilient element is compressed.

12. In combination, an adapter according to claim 1, and at least a third adapter part, the third adapter part having engaging means identical to those of the second adapter part, such that the third adapter part can be connected thereby to the first adapter part, and wherein the second adapter part is configured to receive said second fiber by means of a standard optical fiber connector of one type and the third adapter part is configured to receive a third optical fiber by means of an optical fiber connector of a different type.

13. An adapter according to claim 12, wherein said rotational positions are less than 180° apart.

14. An adapter according to claim 12, wherein said camming and detent means include part-circular grooves in said first part having undercut camming surfaces terminating in recesses and retaining elements comprising legs projecting axially from each said second part and foot portions projecting radially therefrom, said retaining elements being movable through entranceways into said grooves with relative axial movement of the parts in said one rotational position thereof and capable of movement along said grooves upon relative rotation of the parts to said second rotational position at which the foot portions are retained in the recesses, which recesses and foot portions provide said detent means.

15. An adapter according to claim 12, wherein a resilient element is provided between said first and second parts, and wherein said detent means tend to prevent relative rotation of said first and second parts away from said second rotational position until said resilient element is compressed.

16. An adapter combination according to claim 12, wherein each of said second part and said third part has a cap connected thereto by hinge means which tend to close the cap over the first optical fiber end ferrule when no external connector is present, said cap protecting the first optical fiber end ferrule from contamination.

17. An adapter according to claim 16, wherein each of said second part and said third part has a substantially flat side surface, and wherein the cap is connected thereto by a flange of a living hinge mounted on said flat side surface.

18. An adapter according to claim 12, wherein the living hinge biasses the cap to the closed position.

19. An adapter according to claim 12, wherein said complementary surfaces comprise surfaces of flange portions of the first, second and third parts, respectively, each flange portion extending radially outwardly from the axis along which the two parts are drawn together, and said camming and detent means include, in said surface of the flange portion of said first part or each of the second and third parts, part-circular grooves having undercut camming surfaces, and retaining elements projecting axially from said surface of the flange of each of said second parts or said first part, respectively, said retaining elements each having an axially extending leg and a foot portion projecting radially from a distal end of the leg, the foot portion being movable through entranceways into said grooves with relative axial movement of the two parts in said one rotational position thereof and capable of movement along said grooves upon relative rotation of the parts to said second rotational position at which the elements are retained in the grooves.

20. An adaptor according to claim 19, wherein the grooves terminate in recesses wherein the retaining elements are retained when in said second rotational position, the recesses providing said detent means.

21. A combination according to claim 12, wherein each of the optical fiber connector types is included in the group comprising FC, HMS, DIN 2.5, SC, ST and E2000 connectors.

* * * * *